United States Patent [19]
Feldman et al.

[11] 3,720,679
[45] March 13, 1973

[54] 2-METHYLENE GLUTARIMIDE AND PROCESS FOR PREPARING THE SAME

[75] Inventors: Julian Feldman, Cincinnati, Ohio; Martin Thomas, Charlton City, Mass.

[73] Assignee: National Distillers and Chemical Corporation, New York, N.Y.

[22] Filed: Jan. 18, 1971

[21] Appl. No.: 107,527

Related U.S. Application Data

[63] Continuation-in-part of Ser. Nos. 484,448, Sept. 1, 1965, abandoned, and Ser. No. 679,193, Oct. 30, 1967, abandoned, and Ser. No. 830,544, June 4, 1969, abandoned.

[52] U.S. Cl............260/281, 260/465.8, 260/561 K
[51] Int. Cl. .............................................C07d 29/20
[58] Field of Search.......................................260/281

[56] References Cited

UNITED STATES PATENTS

| | | | |
|---|---|---|---|
| 2,609,385 | 9/1952 | Schreyler | 260/465.8 |
| 2,673,205 | 3/1954 | Hoffmann | 260/281 |
| 2,913,478 | 11/1959 | Berther et al | 260/465.4 |
| 3,274,229 | 9/1966 | Verbanic | 260/281 X |
| 3,407,204 | 10/1968 | Shay | 260/281 X |

FOREIGN PATENTS OR APPLICATIONS

| | | | |
|---|---|---|---|
| 768,196 | 9/1967 | Canada | 260/561 |

OTHER PUBLICATIONS

Chem. Abst. Vol. 62, Col. 14508, Abstracts French 1, 385, 833.

*Primary Examiner*—Donald G. Daus
*Attorney*—Allen A. Meyer, Jr.

[57] ABSTRACT

A process is provided for the preparation of alpha-substituted unsaturated aliphatic diamides and alpha-substituted unsaturated aliphatic imides from the corresponding dinitriles, employing an amount of water within the range from about 50 mole percent to about 200 mole percent of that stoiciometrically required to hydrolyze the dinitrile to the diamide, and wherein the acid concentration is within the range of 40 percent to 82 percent, at a temperature within the range of about 0° to 150°C., in the presence of an inorganic or organic acid and in a homogeneous reaction medium. The hydrolysis is arrested, preferably by neutralization.

Diamides are obtained preferentially by neutralizing the mixture at temperatures below about 30° C. Cyclic imides are obtained preferentially by neutralizing the acid hydrolysis mixture at elevated temperatures above about 60° C. The products formed by neutralization at intermediate temperatures are mixtures of the two products.

2 Claims, No Drawings

2-METHYLENE GLUTARIMIDE AND PROCESS FOR PREPARING THE SAME

BACKGROUND OF THE INVENTION

This application is a continuation-in-part of Ser. No. 484,448, filed Sept. 1, 1965 and Ser. No. 679,193, filed Oct. 30, 1967, both of which are now abandoned, and of Ser. No. 830,544, filed June 4, 1969, now abandoned.

This invention relates to a process for the preparation of alpha-substituted unsaturated aliphatic diamides and alpha-substituted unsaturated aliphatic imides from the corresponding unsaturated aliphatic dinitriles, employing water, acid, and moderate reaction temperatures. The imide is formed by cyclizing the diamide formed by the acid hydrolysis by neutralizing the acidic reaction mixture at elevated temperatures.

Berther et al U.S. Pat. No. 2,913,478, patented Nov. 17, 1959, points out that it is known that aliphatic dinitriles can be hydrolyzed by acids or bases to their corresponding diamides, but that if only one of the two nitrile groups is to be hydrolyzed, difficulties are encountered. Berther et al is concerned with the partial hydrolysis of saturated aliphatic dinitriles, such as adipodinitrile, pimelodinitrile, and suberodinitrile. In fact, the mono or diamide is only an intermediate stage before the ultimate hydrolysis product, the acid, is obtained. The stepwise progress of the reaction can be set out as follows:

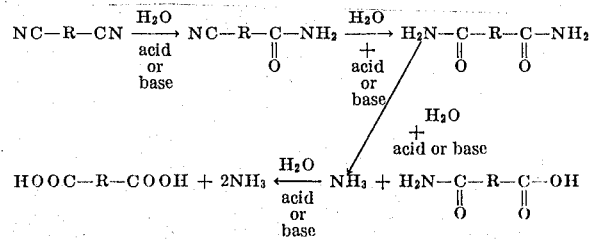

In all, four moles of water are required to form the diacid from the dinitrile. Berther et al make no reference to the preparation of the corresponding imide.

In the case of 2-methylene aliphatic dinitriles, the hydrolysis reaction to diamides is difficult to carry out. The reaction is highly exothermic, and because of the presence of the unsaturated 2-methylene group, highly polymerized or cyclic by-products can be formed, which can constitute the major reaction product, with the result that only a small yield of the desired diamide may be obtained. Because of the highly exothermic nature of the reaction, and the liberation of large quantities of heat, it is quite difficult to control the reaction to obtain the desired diamide. Moreover, it is difficult to arrest the reaction at the diamide stage. Thus, the result is that if dilute acids are employed, so as to more effectively control the rate of reaction, the tendency to form the diacid is increased, because of the large proportion of water, and if a concentrated acid is used, the reaction becomes quite difficult to control because of the large amounts of heat liberated. The use of strong bases, on the other hand, leads to the formation of cyclic cyanolactams, by interaction of one nitrile group with the unsaturated group.

SUMMARY OF THE INVENTION

In accordance with the instant invention, a process for the preparation of alpha-substituted unsaturated aliphatic diamides and/or of alpha-substituted unsaturated aliphatic imides from the corresponding dinitriles is provided which makes it possible to obtain excellent yields of the diamide and/or imide in a high state of purity, relatively free from undesirable by-products. It has been determined that if the hydrolysis is carried out in the presence of a strong acid, while limiting the amount of water required to at most about 200 mole percent of that stoichiometrically required to form the corresponding diamide from the dinitrile, at a temperature within the range of from about 0° to 150° C., the hydrolysis of the dinitrile to the diamide proceeds straightforwardly, and can be arrested at the diamide stage without formation of a significant proportion of the mono or diacid derivative. The imide can then be prepared by neutralizing the reaction mixture with a base at elevated temperatures to cyclize the diamide to the corresponding imide, with the formation of by-product ammonia.

In carrying out the process of this invention, the hydrolysis reaction is suitably arrested by neutralizing with a base, preferably ammonia. However, where it is desired to form the diamide, especially where there is no water in excess of the stoichiometric amount of water present, it is unnecessary to neutralize the reaction mixture. The diamide can then be recovered by precipitation, e.g., when the reaction is carried out in the presence of sulfuric acid, by pouring the hydrolysis mixture over ice or by quenching the same in alcohol.

When the reaction mixture is neutralized, the temperature at which the neutralization is carried out determines whether the product will be the diamide, or the imide, or a mixture of the two. Generally, at temperatures below about 30° C., and preferably below 10°–20 C., the diamide substantially free from imide is obtained. At neutralization temperatures above about 60° C., the imide substantially free from diamide is obtained. Intermediate neutralization temperatures will give mixtures of the two products, higher temperatures favoring production of more imide, lower temperatures favoring production of more diamide.

Neutralization at elevated temperatures, i.e., at temperatures above about 100° C, are not employed in the present process since such have been found to effect cyclization of the diamide with a loss of one amino group. Hence, when R is an unsaturated aliphatic group, the following reaction takes place when the hydrolysis mixture is neutralized at elevated temperatures:

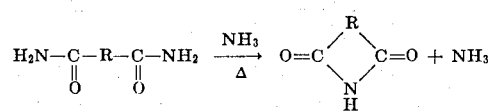

The invention is applicable to the hydrolysis of 2-methylene aliphatic dinitriles as a class. These can be defined by the formula:

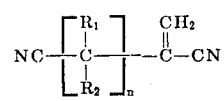

wherein $R_1$ and $R_2$ are hydrogen or alkyl groups having from about one to ten carbon atoms, n is an integer ranging from about one to ten, and the total number of carbon atoms in the dinitrile is preferably from 5 to 20, and desirably from 5 to about 12. Exemplary of the aliphatic dinitriles falling within the above class are 2-methylene-glutaronitrile, itaconodinitrile, xeronodinitrile, 2-methylene-adipodinitrile, 2-methylene-suberodinitrile, 2-methylene-azelaodinitrile, and 2-methylene-sebacodinitrile. Other dinitriles falling within the above class will be evident to those skilled in the art. Preferably, however, the process of the invention is utilized in the hydrolysis of itaconodinitrile or, desirably, 2-methylene glutaronitrile.

2-methylene-glutaronitrile forms 2-methylene-glutaramide which is preferably utilized in the preparation of copolymer resins for coating compositions. The preparation of these resins and the formulation of coatings therefrom is more fully described in Gaylord U.S. Pat. No. 3,452,117 owned by the assignee of this invention. Such description is incorporated by reference as if more fully set forth herein. The corresponding 2-methylene-glutarimide is similarly particularly useful in the preparation of copolymer resins, as well as for use as a herbicide and a rodenticide.

Alternatively, the unsaturated aliphatic diamides and the unsaturated aliphatic imides that are obtained in accordance with the process of the invention can readily be converted into the corresponding unsaturated diacids, diesters, and diols, and saturated diacids, diesters, and diols, by further hydrolysis, hydrogenation and esterification procedures. The saturated and unsaturated aliphatic diesters thus formed can be used as plasticizers for synthetic resins, for example. Also, the diamides and imides can be used in the formation of polymers which have been utilized in fibers, coatings, films, molding, casting and extrusion resins, adhesives and like compositions, typical of those formed by synthetic resins. Further, the unsaturated group can be epoxidized by reaction with ozone or hydrogen peroxide, and the resulting epoxy diamides also are useful in the formation of polymers, by reaction at the amide group and at the epoxy group, readily forming polyepoxy resins using the conventional polyepoxy resin curing agents. Because of the presence of both unsaturated and amide linkages, the products of the process of the invention are thus useful adjuncts in chemical syntheses.

PREFERRED EMBODIMENTS OF THE INVENTION

Approximately two moles of water are required for each mole of dinitrile, in the conversion thereof to the diamide. Consequently, the amount of water that is preferably employed in the present process is approximately two moles per mole of the dinitrile, and this is the amount that would generally be employed in a batch process. Frequently, however, in a continuous operation, it is desirable to employ less than the stoichiometric amount, in order to facilitate control of the reaction, recycling any unreacted dinitrile to the reaction zone after separation of the reaction products therefrom. It is accordingly within the contemplation of the invention to employ as little as 50 mole percent of the amount of water stoichiometrically required, i.e., as little as one mole of water per mole of dinitrile.

The amount of water that is present should not exceed approximately 200 mole percent of that stoichiometrically required, i.e., approximately 4 moles per mole of dinitrile. The presence of more water than this favors the conversion of the diamide product to either the mono or diacid, which is not desired.

The hydrolysis of the dinitrile proceeds in the presence of any inorganic or organic non-oxidizing acid. Strong acids are normally employed, such as, for example, sulfuric acid, hydrochloric acid (including hydrogen chloride gas) and phosphoric acid. Strong organic acids, such as acetic acid, formic acid, oxalic acid, trichloroacetic acid, dichloroacetic acid, propionic acid and citric acid, also can be employed. Particularly good results have, however, been obtained employing sulfuric acid as the hydrolysis catalyst.

The acid can be employed in the form of an aqueous solution, but in view of the limitation on the amount of water, the aqueous solution is normally concentrated.

The concentration of the acid utilized is within the range of from about 40 percent to about 82 percent, and preferably from about 50 percent to about 80 percent, by weight of the reaction mixture, including the water and dinitrile. Acid solutions below about 40 percent w concentrations will not dissolve the nitrile and solutions above about 82 percent w concentrations may cause undesirable polymeric by-products.

There can also be employed polymerization inhibitors to inhibit formation of the undesirable polymerization product. However, because of the facility with which the reaction proceeds under the described conditions, the use of an inhibitor is not essential. An excellent yield of a product of high purity can be obtained in its absence. Inhibitors which can be employed, if desired, include copper powder and the like. The amount of inhibitor is within the range of from about 0.1 to about 10 percent, and preferably from about 0.2 to about 0.5 percent, based on the total weight of the reaction mixture.

The hydrolysis reaction proceeds at low temperatures, but the rate of reaction may be rather slow. At high temperatures the formation of by-products and polymerization products is favored. Consequently, the hydrolysis reaction is normally carried out at a temperature within the range of from about 0° to about 150° C., so as to obtain an appropriate balance between rate of reaction and a minimum formation of undesirable by-products. Temperatures below about 0° C. will retard the reaction and temperatures above about 150° C. may cause undesirable thermal polymerization.

In order to maintain a hydrolysis reaction temperature within this range, it is necessary to provide means for cooling the reaction mixture, because of the large amounts of heat that are liberated therefrom. It is important that the reaction temperature be maintained within the stated range, and for this purpose effective cooling may be necessary, particularly when large volumes of reaction mixture are being handled.

The reaction pressure is in no way critical, and can range from atmospheric up to about 1000 psi and preferably from about atmospheric up to about 100 psi.

The reaction time can vary between 30 seconds and 24 hours with a preferred range of 30 minutes to two hours. In this connection, the amide reaction product should not be allowed to remain in the sulfuric acid for any considerable length of time since such could cause further hydrolysis to the acid.

It is required that this reaction be performed in a homogeneous reaction medium in order to dissolve the nitrile.

It should be understood that the formation of the desired alpha-substituted unsaturated aliphatic diamides and imides in accordance with this invention is facilitated by use of the combination of reaction parameters (e.g., temperature, time, acid concentration and water content) specified hereinabove. Variation of any one of these parameters may, of course, necessitate modifications of other of the reaction conditions within the indicated ranges. For example, when the reaction is conducted at a temperature close to the 150° C. maximum recited herein, the amount of time required for the reaction may be as low as the 30-second minimum residence time noted.

Similarly, the acid concentrations utilized will affect the amount of excess, free water available for hydrolysis. In this connection reference may be made to: "A Chemical Hydration Treatment of Concentrated Acid Solutions," Wyatt, Discussions of Faraday Society, 24, 162–70 (1957) and "The Thermodynamic Properties of Aqueous Sulfuric Acid Solutions and Hydrates from 15° to 300° C," Giauque et al., J.A.C.S., 82,62–70 (1960).

It will be seen from the preceding that the amount of solution which is actually available as free water for the reaction may not be ascertainable. The amount of available water for any given acid concentration varies with the reaction temperature since the temperature affects the stability of the sulfuric acid mono, di and tetrahydrates inherently present therein.

Further, as noted above, it is important to provide efficient means of heat removal from the reaction mixture during the hydrolysis process because of the highly exothermic nature of the reaction. If the heat removal procedure is quite efficient and/or it is possible to maintain large heat transfer surfaces, particularly high acid concentrations and/or reaction temperatures may be used within the above ranges.

Upon completion of the hydrolysis reaction to form the diamide, or whenever it is desired that the reaction be arrested, the acid is neutralized. This can be effected by addition of ammonia or other base after dilution in a suitable solvent such as isopropanol. The final product depends upon the temperature of neutralization, and therefore it is important that the temperature of neutralization be controlled.

It has been determined that if neutralization is effected at a temperature below about 30° C., and preferably between 10° and 20° C., there is substantially no cyclization. At temperatures about 30° C., cyclization to the imide begins and at temperatures above about 60° C., there is almost complete cyclization of the diamide. At temperatures between 30° and 60° C., the product obtained is composed of a mixture of the diamide and the cyclic imide, the relative proportions being determined by the temperature, i.e., as the temperature increases the proportion of the imide increases, with a corresponding decrease in the amount of diamide present. Accordingly, by varying the neutralization temperature a product can be obtained varying from diamide substantially free from imide, to imide substantially free from diamide.

Generally, the heat of neutralization is sufficient to increase the temperature during neutralization to at least 60° C. or 70° C. without requiring any application of external heat. If the diamide is desired, or a mixture of diamide and imide, the neutralization mixture must be cooled, as in an ice bath or water bath, to the desired lower temperature. When the heat of neutralization is not sufficient to warm the neutralization mixture to the desired temperature, an additional source of heat can, of course, be applied. Generally, the maximum temperature during neutralization is about 100° C.

The major by-product of the neutralization is, of course, the salt of the acid employed with the base that is added, such as, for instance, ammonium sulfate, in the case of ammonia and sulfuric acid. If the neutralization is carried out in a reaction medium in which the salt is insoluble, the salt precipitate that is obtained following the neutralization can be separated by filtration, together with any other insoluble materials, and the filtrate can then be concentrated to recover the desired diamide or imide product. For example, when the former is to be recovered the reaction mixture can be quenched in cold alcohol, followed by addition of anhydrous ammonia, after which the resulting ammonium salt is separated by filtration, and the alcoholic filtrate is concentrated under reduced pressure. Reduced pressure is employed in order to keep the temperature of solvent recovery as low as possible, to avoid decomposition of the unsaturated diamide reaction product.

In place of ammonia, other bases can be employed for neutralizing the hydrolysis mixture, such as sodium hydroxide, potassium hydroxide, sodium carbonate, potassium carbonate, strontium hydroxide, calcium hydroxide, barium hydroxide, barium carbonate, ammonium bicarbonate, and ammonium hydroxide.

The 2-methylene aliphatic dinitriles used as starting materials in the process of the invention are known compounds, and are obtained using known procedures. Such procedures are described, for example, in French Pat. No. 138,844; Belgian Pat. No. 677,175; Belgian Pat. No. 677,265; French Pat. No. 1,411,003; British Pat. No. 1,018,220; and Journal of Organic Chemistry, 30, 1357–60 (1965).

The following examples represent preferred embodiments of the invention:

EXAMPLE 1

91 g. (0.86 mole) of 2-methylene glutaronitrile is added at a uniform drop rate with good agitation over a period of 15 minutes to 200 g. of aqueous sulfuric acid (78.2 percent) in the presence of 0.1 g. of copper powder. Of the 200 g. sulfuric acid, 44 g. is water, so that 2.44 moles of water, or 141 mole percent of theory (1.72 moles) is present. During the addition of the 2-methylene glutaronitrile the temperature is maintained at 50°–53° C. After the addition of the 2-methylene glutaronitrile, the temperature is permitted to rise to 87° C and the reaction mixture is maintained within the temperature range of 85°–90° C for approximately one hour. The reaction product mixture is cooled to 400° C and added to 1500 ml. of cold isopropyl alcohol. The solution is neutralized with anhydrous ammonia, with the temperature during neutralization maintained in the range of 25° to 40° C. The insoluble materials are removed by filtration and the filtrate is concentrated, resulting in a yield of 94.8 g. of 2-methylene glutaramide having a melting point range of 140°–155° C. No cyclic imide is formed. The theoretical yield is 122 g.

EXAMPLE 2

The procedure of Example 1 is repeated, using 209 g. of aqueous sulfuric acid (80.8 percent). The amount of water present is 40 g. (2.22 moles) or 129 mole percent of theory. A yield of 82.7 g. of 2-methylene glutaramide having a melting point range of 150°–155° C is obtained. No cyclic imide is formed. A second batch of 2-methylene glutaramide (16.0 g., mp range of 150°–160° C) is obtained by evaporating the mother liquor and washing the resulting material with warm isopropyl alcohol.

EXAMPLE 3

The procedure of Example 1 is repeated using 300 g. of aqueous sulfuric acid (78.2 percent). The amount of water present is 66g. (3.67 moles or 212 mole percent of theory). The resultant yield of 2-methylene glutaramide is 33.1 g. with a melting point range of 167°–168° C. No cyclic imide is formed.

The yield of diamide in Example 3 is somewhat low due to the fact that the water concentration 212 mole percent of theory, is above the preferred range of 50–200 mole percent.

CONTROL A

The procedure of Example 1 is repeated using 200 g. of aqueous sulfuric acid (84.5 percent). The amount of water present is 31 g. (1.72 moles) or 100 mole percent of theory. However, the reaction mixture is extremely difficult to control due to the fact that the temperature rises too rapidly and the mixture eventually explodes, so that no product is obtained.

CONTROL B

The procedure of Example 1 is repeated using 300 g. of aqueous sulfuric acid (84.5 percent). The amount of water present is 46.5 g. (2.58 moles) or 150 mole percent of theory. As in Example 4, the reaction mixture is difficult to control due to the rapidly rising temperature. The yield of product is negligible.

Controls A and B demonstrate the difficulty in obtaining acceptable diamide product yields where very high acid concentrations are utilized. It appears that such high acid concentrations may cause formation of products in addition to the diamide, which other products are formed by highly exothermic reaction, resulting in the rapid temperature rises described.

On the other hand, Examples 1 to 3, and particularly Examples 1 and 2, demonstrate that 2-methylene glutaramide in high yields is conveniently and readily obtainable in accordance with the process of this invention without the formation of substantial quantities of undesirable by-products if the reaction is carried out within the previously described reaction parameters.

Itaconamide can be prepared in accordance with the process of the invention as follows:

EXAMPLE 4

79 g. (0.86 mole) of itaconodinitrile is added dropwise with good agitation over a period of 10 minutes to 200 g. of aqueous sulfuric acid (80 percent) in the presence of 0.1 g. of copper powder. During the addition of the itaconodinitrile the temperature is maintained at 50° C. After the addition of the itaconodinitrile, the temperature is permitted to rise to 102° C., whereupon an ice bath is applied and the temperature of the reaction mixture is maintained within the temperature range of 87° to 100° C. for approximately one hour. The reaction product mixture is cooled to 40° C. and added to 1500 ml. of cold isopropyl alcohol. The solution is neutralized with anhydrous ammonia at a temperature of about 25° C., and the insoluble materials are removed by filtration. Then, the filtrate is evaporated under reduced pressure, resulting in a high yield of itaconamide. No cyclic imide is obtained.

As indicated above and in accordance with another feature of the present invention, 2-methylene glutarimide can be readily prepared from 2-methylene glutaronitrile. This is demonstrated by the following illustrative embodiment:

EXAMPLE 5

91 g. (0.86 mole) of 2-methylene glutaronitrile is added with rapid stirring to 200 g. of 78.2 percent sulfuric acid at an initial temperature of 50° C. The total time required for the addition is 19 minutes. The temperature is allowed to reach a maximum of 53° C. during the addition, then held between 85° – 90° C. by means of an ice bath for an additional 60 minutes, before cooling to 40° C. The resulting reaction product mixture is added to 1500 ml. of isopropanol and, after standing overnight (about 20 hours) at 27° C., is neutralized with anhydrous ammonia at a temperature of about 65° to 70° C.

Concentration of the filtrate by evaporation under vacuum gives 48.9 g. of product (45 percent of theory) with a melting point of 120°–122° C. The nitrogen content is 10.8 percent; theory 11.2 percent. NMR, mass spectrometry, and infrared analyses reveal that the structure of the product compound corresponds to 2-methylene glutarimide. No 2-methylene glutaramide is detected.

Hydrogenation of a 10 g. sample at 18°–20° C. in the presence of ethanol (300 ml.) and 1.7 g. of platinum oxide as the catalyst yields 7.6 g. of 2-methyl glutarimide, with a melting point of 89° – 90° C. after recrystallization; the literature melting point is 91° C.

Both 2-methylene glutarimide and 2-methyl glutarimide may be used in the preparation of relatively water-insoluble, microbiologically active quaternary ammonium compounds. Water-soluble salts of the glutarimide compounds, for example, sodium-t-methyl glutarimide or potassium 2-methylene glutarimide, are thus reacted with an aqueous solution of a quaternary ammonium salt having microbiologically active properties to form such water-insoluble products. The water-insoluble products are useful to mildew-proof fabrics, as paint mildewstats, fuel additives to control growth of microorganisms, and as additives to polymeric synthetic plastics or rubbery materials as anti-microbial agents. A more complete statement of this use is set out in U.S. Pat. No. 3,407,204.

What is claimed is:

1. A process for preparing 2-methylene glutarimide, which consists of reacting 2-methylene glutaronitrile with water in the amount of from 50 mole percent to 200 mole percent of that stoichiometrically required to form 2-methylene glutaramide, in the presence of from 40 to 90 percent by weight of sulfuric acid and from 0.1 to 10 percent by weight of copper powder at a temperature within the range of from 0° to 15° C., to form a reaction mixture containing 2-methylene glutaramide, neutralizing the resulting reaction mixture with inorganic base at a temperature of at least 60° C., and recovering 2-methylene glutarimide therefrom.

2. 2-Methylene glutarimide.